(12) United States Patent
White

(10) Patent No.: US 10,634,317 B2
(45) Date of Patent: Apr. 28, 2020

(54) DYNAMIC CONTROL OF VEHICLE LAMPS DURING MANEUVERS

(71) Applicant: Toyota Motor Engineering & Manufacturing North America, Inc., Erlanger, KY (US)

(72) Inventor: Chelsea R. White, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/667,880

(22) Filed: Aug. 3, 2017

(65) Prior Publication Data
US 2019/0041038 A1 Feb. 7, 2019

(51) Int. Cl.
| | |
|---|---|
| *B60Q 1/00* | (2006.01) |
| *F21V 1/00* | (2006.01) |
| *F21V 14/02* | (2006.01) |
| *B60Q 1/08* | (2006.01) |
| *B60Q 1/076* | (2006.01) |
| *F21S 41/00* | (2018.01) |
| *G01S 17/931* | (2020.01) |

(52) U.S. Cl.
CPC ............. *F21V 14/02* (2013.01); *B60Q 1/076* (2013.01); *B60Q 1/08* (2013.01); *F21S 41/00* (2018.01); *B60Q 2300/112* (2013.01); *B60Q 2300/122* (2013.01); *G01S 17/931* (2020.01); *G06T 2207/30252* (2013.01)

(58) Field of Classification Search
USPC ........................................................ 362/466
See application file for complete search history.

(56) References Cited

U.S. PATENT DOCUMENTS

| | | | |
|---|---|---|---|
| 4,024,388 A | 5/1977 | Skoff | |
| 6,293,686 B1 | 9/2001 | Hayami et al. | |
| 7,112,925 B2 | 9/2006 | Numajiri et al. | |
| 7,859,432 B2 * | 12/2010 | Kim | B60Q 9/008 340/435 |
| 9,758,088 B1 * | 9/2017 | Salter | B60Q 1/0041 |

(Continued)

OTHER PUBLICATIONS

"Cornering light function", http://techcenter.mercedes-benz.com/en IN/cornering light/detail.html Published/Accessed: May 5, 2017.

*Primary Examiner* — Tuyen K Vo
(74) *Attorney, Agent, or Firm* — Dinsmore & Shohl LLP

(57) ABSTRACT

A vehicle lamp control system includes an electronic control unit having a processor and a non-transitory computer readable memory including a machine-readable instruction set. The electronic control unit is communicatively coupled to a camera configured to output image data of a vehicle environment, a vehicle lamp and a steering wheel sensor. The machine-readable instruction set causes the processor to receive the image data of the vehicle environment from the camera, determine whether an external light source is present in the vehicle environment based on the image data of the vehicle environment, determine a steering wheel angle based on an output signal of the steering wheel sensor, and generate a control signal for activating the vehicle lamp when the steering wheel angle exceeds an activation steering threshold and no external light source is detected in the vehicle environment.

20 Claims, 7 Drawing Sheets

(56) References Cited

U.S. PATENT DOCUMENTS

| | | | |
|---|---|---|---|
| 2006/0250809 A1 | 11/2006 | Strazzanti | |
| 2011/0074956 A1* | 3/2011 | Faber | G02B 23/12 |
| | | | 348/148 |
| 2011/0280026 A1* | 11/2011 | Higgins-Luthman | ....................... |
| | | | B60Q 1/143 |
| | | | 362/466 |
| 2013/0201704 A1* | 8/2013 | Lin | B60Q 1/12 |
| | | | 362/464 |
| 2013/0258688 A1* | 10/2013 | Kalapodas | B60Q 1/085 |
| | | | 362/465 |
| 2017/0106783 A1* | 4/2017 | Fritz | B60Q 1/08 |

* cited by examiner

DYNAMIC CONTROL OF VEHICLE LAMPS DURING MANEUVERS

TECHNICAL FIELD

The present specification generally relates systems and methods for controlling vehicle lamps and, more specifically, systems and methods for dynamically controlling vehicle lamps during a vehicle turning maneuver.

BACKGROUND

Vehicles are generally equipped with a set of headlamps including at least low beam lamps, high beam lamps and turn signal blinkers. In addition to the general set of headlamps, vehicles today may also include auxiliary lamp set for improving vision during driving, such as fog lamps, bend lamps, and cornering lamps. These lamps improve driver visibility during varying weather conditions, road topologies and lighting conditions. As such, vehicle lamps may need to be controlled during turning maneuvers.

SUMMARY

In one embodiment, a vehicle lamp control system includes an electronic control unit having a processor and a non-transitory computer readable memory including a machine-readable instruction set. The electronic control unit is communicatively coupled to a camera configured to output image data of a vehicle environment, a vehicle lamp and a steering wheel sensor. The machine-readable instruction set causes the processor to receive the image data of the vehicle environment from the camera, determine whether an external light source is present in the vehicle environment based on the image data of the vehicle environment, determine a steering wheel angle based on an output signal of the steering wheel sensor, and generate a control signal for activating the vehicle lamp when the steering wheel angle exceeds an activation steering threshold and no external light source is detected in the vehicle environment.

In another embodiment, a method for controlling a vehicle lamp includes receiving image data of a vehicle environment from at least one external environment camera, determining whether an external light source is present in the vehicle environment based on the image data of the vehicle environment, determining a steering wheel angle based on an output signal of a steering wheel sensor, and generating a control signal for activating a vehicle lamp when the steering wheel angle exceeds an activation steering threshold and no external light source is detected in the vehicle environment.

In yet another embodiment, a vehicle includes an electronic control unit having a processor and a non-transitory computer readable memory including a machine-readable instruction set. The electronic control unit is communicatively coupled to a camera configured to output image data of a vehicle environment, a vehicle lamp and a steering wheel sensor. The machine-readable instruction set causes the processor to receive the image data of the vehicle environment from the camera, determine whether an external light source is present in the vehicle environment based on the image data of the vehicle environment, determine a steering wheel angle based on an output signal of the steering wheel sensor, and generate a control signal for activating the vehicle lamp when the steering wheel angle exceeds an activation steering threshold and no external light source is detected in the vehicle environment.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments disclosed herein include vehicle lamp control systems and methods for controlling a vehicle headlamp. Referring generally to the figures, the vehicle lamp control systems and methods include at least one external environment camera to output image data of a vehicle environment. The image data may be received by an electronic control unit having a processor and non-transitory computer readable memory. The image data is analyzed by the processor to determine whether an external light source is present in the vehicle environment. The electronic control unit also receives signal from a steering wheel sensor indicative of an angle of rotation of a steering wheel. The processor may determine the vehicle is making a turn if the steering wheel angle is greater than a threshold. In response, the electronic control unit may activate or deactivate a vehicle headlamp. In particular, the electronic control unit may activate a cornering lamp when the steering wheel angle is greater than a threshold and no external light source is present in the vehicle environment. The vehicle lamp control systems and methods for controlling a vehicle headlamp based on image data of a vehicle environment improves the activation of vehicle headlamps in locations determined to be insufficiently illuminated during vehicle maneuvers while also accounting for and reducing the occurrences of temporarily blinding, impairing, or distracting pedestrians or drivers of a vehicle in the illumination path of the vehicle headlamps. The various vehicle lamp control systems and methods for controlling a vehicle headlamp based on image data of a vehicle environment will be described in more detail herein with specific reference to the corresponding drawings.

Figure 1A:
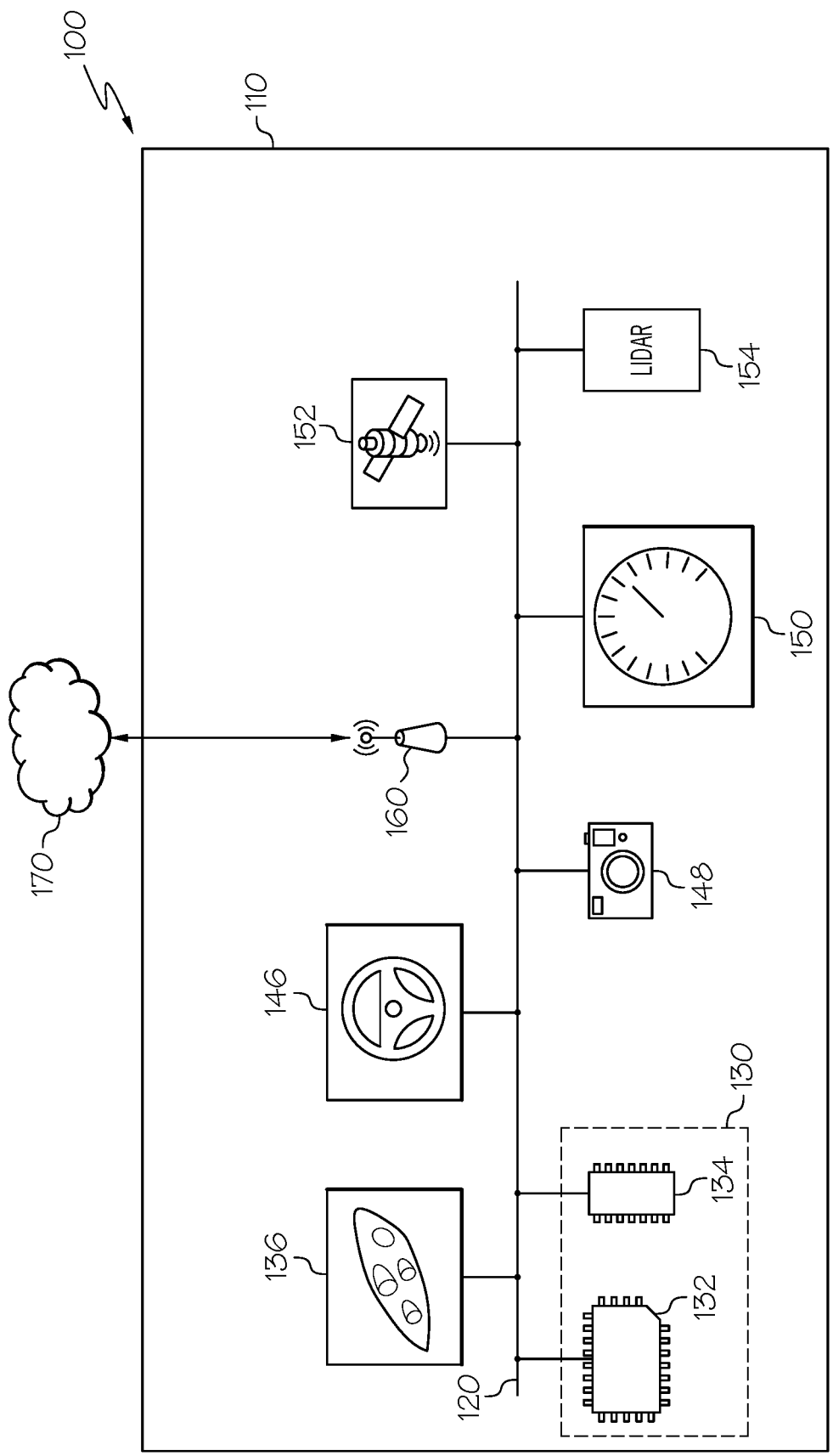
FIG. 1A schematically depicts components of a vehicle lamp control system for controlling vehicle headlamps according to one or more embodiments shown and described herein.
Figure 1B:
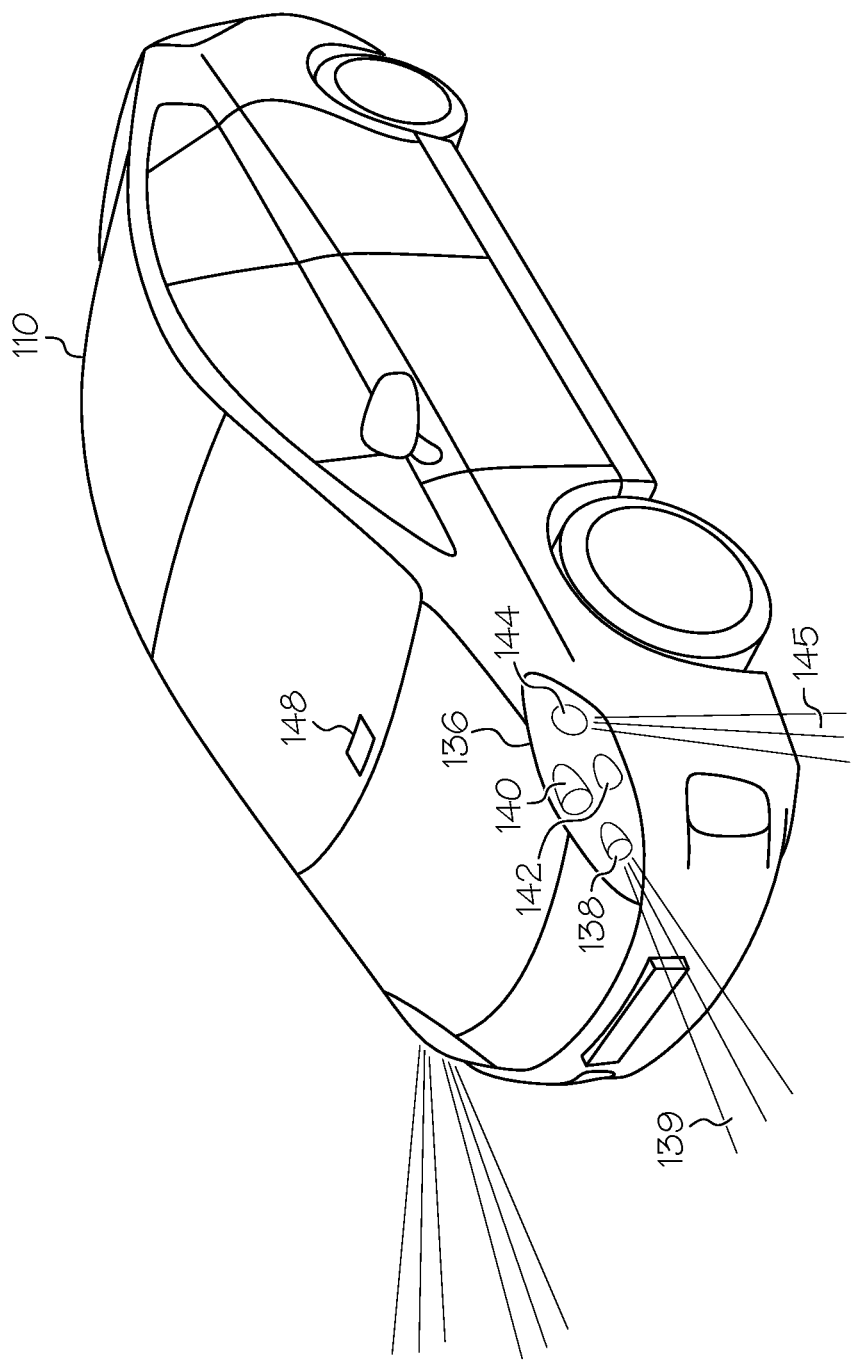
FIG. 1B depicts a vehicle equipped with a vehicle lamp control system for controlling vehicle headlamps according to one or more embodiments shown and described herein.

Turning now to the drawings wherein like numbers refer to like structures, and particularly to FIGS. 1A and 1B where a vehicle lamp control system 100 for a vehicle headlamp and a vehicle 110 employing the vehicle lamp control system 100 are depicted, respectively. The vehicle lamp control system 100 of vehicle 110 generally includes, a communication path 120, an electronic control unit 130 having a processor 132 and a non-transitory computer readable memory 134, a vehicle headlamp unit 136, a steering wheel sensor system 146, at least one external environment camera 148, a vehicle speed sensor 150, a global positioning system (GPS) 152, a LIDAR system 154, and network interface hardware 160. The vehicle 110 may be communicatively coupled to a network 170 by way of the network interface hardware 160. The components of the vehicle lamp control system 100 may be contained within or mounted to a vehicle 110. The various components of the vehicle lamp control system 100 and the interaction thereof will be described in detail below.

The communication path 120 may be formed from any medium that is capable of transmitting a signal such as, for example, conductive wires, conductive traces, optical waveguides, or the like. The communication path 120 may also refer to the expanse in which electromagnetic radiation and their corresponding electromagnetic waves traverses. Moreover, the communication path 120 may be formed from a combination of mediums capable of transmitting signals. In one embodiment, the communication path 120 comprises a combination of conductive traces, conductive wires, connectors, and buses that cooperate to permit the transmission of electrical data signals to components such as processors, memories, sensors, input devices, output devices, and communication devices. Accordingly, the communication path 120 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 120 communicatively couples the various components of the vehicle lamp control system 100. As used herein, the term "communicatively coupled" means that coupled components are capable of exchanging signals with one another such as, for example, electrical signals via conductive medium, electromagnetic signals via air, optical signals via optical waveguides, and the like.

Still referring to FIGS. 1A and 1B, the electronic control unit 130 may be any device or combination of components comprising a processor 132 and non-transitory computer readable memory 134. The processor 132 of the vehicle lamp control system 100 may be any device capable of executing the machine-readable instruction set stored in the non-transitory computer readable memory 134. Accordingly, the processor 132 may be an electric controller, an integrated circuit, a microchip, a computer, or any other computing device. The processor 132 is communicatively coupled to the other components of the vehicle lamp control system 100 by the communication path 120. Accordingly, the communication path 120 may communicatively couple any number of processors 132 with one another, and allow the components coupled to the communication path 120 to operate in a distributed computing environment. Specifically, each of the components may operate as a node that may send and/or receive data. While the embodiment depicted in FIG. 1A includes a single processor 132, other embodiments may include more than one processor 132.

The non-transitory computer readable memory 134 of the vehicle lamp control system 100 is coupled to the communication path 120 and communicatively coupled to the processor 132. The non-transitory computer readable memory 134 may comprise RAM, ROM, flash memories, hard drives, or any non-transitory memory device capable of storing machine-readable instructions such that the machine-readable instructions can be accessed and executed by the processor 132. The machine-readable instruction set may comprise logic or algorithm(s) written in any programming language of any generation (e.g., 1GL, 2GL, 3GL, 4GL, or 5GL) such as, for example, machine language that may be directly executed by the processor 132, or assembly language, object-oriented programming (OOP), scripting languages, microcode, etc., that may be compiled or assembled into machine readable instructions and stored in the non-transitory computer readable memory 134. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 1A includes a single non-transitory computer readable memory 134, other embodiments may include more than one memory module.

The vehicle lamp control system 100 also includes a vehicle headlamp unit 136, which is communicatively coupled to the electronic control unit 130 such that the individual lamp units within the vehicle headlamp unit 136 may be selectively activated and deactivated. As shown in FIG. 1B in detail, the vehicle headlamp unit 136 may include a number of lamp units. The vehicle headlamp unit 136 may include a low beam lamp 138, a high beam lamp 140, a blinker lamp 142, and a cornering lamp 144. While only four types of lamps are identified in the vehicle headlamp unit 136, other lamps may be included to serve additional illumination or signaling purposes. Additionally, the vehicle headlamp unit 136 may include individual lamp units configured on the vehicle separate from a single vehicle headlamp unit 136. For example, the cornering lamp 144 or a fog lamp (not depicted) may be configured as a separate lamp unit below or adjacent to the vehicle headlamp unit 136. However, for purposes herein whether the individual lamp units are configured within a single vehicle headlamp unit 136, separately, or in combination that is not intended to limit the scope of the vehicle lamp control system 100 or method.

The low beam lamp 138 operates to illuminate the path or road in front of the vehicle 110 during period of low visibility, for example, when visibility is less than about 500 feet. Typically, these are the standard headlamps used when driving at night or in darkness and may also be employed during heavy rain or fog. The high beam lamp 140 operates to illuminate the path or road in front of the vehicle 110 during period of very low visibility and generally in very dark environments such as country roads where no city lights or street lamps may provide secondary illumination. As shown in FIG. 1B, low beam lamp 138 projects low beam light 139. The high beam lamp 140 may illuminate a greater distance than the low beam lamp 138 and in some configurations provide a wider illuminated viewing angle than the low beam lamp 138. However, the use of the high beam lamp 140 may temporarily blind, impair, or distract pedestrians or a driver of a vehicle in their illumination path.

The blinker lamp 142 unlike some of the other lamps in the vehicle headlamp unit 136 is not limited to the vehicle headlamp unit 136. The blinker lamp 142 is also included in a tail lamp assembly and optionally in various other locations on the vehicle 110 to provide an indication or warning to others when a driver intends to change lanes or preform a turning maneuver.

The cornering lamp 144 operates to illuminate the path or road in front of the vehicle 110 as well as to the side of the vehicle 110 so that a driver may be able to view an environment the vehicle is turning or maneuvering into. The cornering lamp 144 may be positioned on the vehicle or within the vehicle headlamp unit 136 so to provide illumination at least partially outside the lengthwise direction of the vehicle 110. As shown in FIG. 1B, cornering lamp 144 projects cornering light 145. In some embodiments, the cornering lamp 144 utilizes lamp units such as a bend lamp, fog lamp or other lamps configured with the vehicle 110 to produce cornering light 145.

Still referring to FIGS. 1A and 1B, the steering wheel sensor system 146 is coupled to the communication path 120 and communicatively coupled to the electronic control unit 130. The steering wheel sensor system 146 may comprise a plurality of sensors located in the steering wheel for determining a driver grip on the steering wheel, the degree of rotation applied to the steering wheel or the forces applied in turning or maintaining the steering wheel. The steering wheel sensor system 146 may provide signals to the electronic control unit 130 indicative of the location and number of hands on the steering wheel, the strength of the grip on the steering wheel, or changes in position of one or more hands on the steering wheel. The steering wheel sensor system 146, for example, without limitation, may include pressure sensors, inductive sensors, optical sensors, or the like. In addition to detecting the location, number, grip and change in position of one or more hands on the steering wheel, the steering wheel sensor system 146 may also include one or more sensors indicating the rotational angle of the steering wheel and corresponding signals to the electronic control unit 130. As later described, the combination of steering wheel rotation and steering wheel grip may be suggestive of a driver planning to initiate a vehicle turning maneuver. It should be understood that some embodiments may not include a steering wheel sensor system 146.

Still referring to FIGS. 1A and 1B, at least one external environment camera 148 is coupled to the communication path 120 and communicatively coupled to the electronic control unit 130 and consequently the processor 132. The at least one external environment camera 148 may be any device having an array of sensing devices (e.g., pixels) capable of detecting radiation in an ultraviolet wavelength band, a visible light wavelength band, or an infrared wavelength band. The at least one external environment camera 148 may include or be associated with a night vision system or low light system. The at least one external environment camera 148 may have any resolution; however, high resolution may provide for enhanced light and object identification and detection. The at least one external environment camera 148 may be an omni-directional camera, or a panoramic camera. In some embodiments, one or more optical components, such as a mirror, fish-eye lens, or any other type of lens may be optically coupled to each of the at least one external environment camera 148. The at least one external environment camera 148 may be positioned within or on the vehicle 110 to view the environment external to the vehicle 110. For example, without limitation, at least one external environment camera 148 may be positioned on the dashboard of the vehicle 110 to capture images of the surroundings in front of the vehicle 110 during operation. The position of the at least one external environment camera 148 is not limited to the dashboard of the vehicle 110. The at least one external environment camera 148 may be positioned anywhere on or within the vehicle 110 to capture images of surroundings of the vehicle 110 during operation.

The at least one external environment camera 148 captures images of the surroundings of the vehicle and generates image data which is communicated to the electronic control unit 130 and processor 132. The image data may be received by the processor 132, which process the image data using one or more light detection and quantification algorithms. Any known or yet-to-be developed video and image light detection and quantification algorithms may be implemented to analyze the image data in order to determine a source location of light from the image data of the vehicle environment, quantity of light in various portions of the vehicle environment, the type of light, for example artificial or natural, whether the source is overhead or lateral to the vehicle or the like.

In addition to identifying and determining sources and quantities of light in the vehicle environment, the processor 132 may employ one or more object recognition algorithms to the image data to extract objects and features. Any known or yet-to-be-developed object recognition algorithms or facial recognition algorithms may be used to extract the objects and features from the image data. Example object recognition algorithms or facial recognition algorithms include, but are not limited to, scale-invariant feature transform ("SIFT"), speeded up robust features ("SURF"), and edge-detection algorithms. The object recognition algorithms or facial recognition algorithms may be stored in the non-transitory computer readable memory 134 and executed by the processor 132.

A vehicle speed sensor 150 is also coupled to the communication path 120 and communicatively coupled to the electronic control unit 130. The vehicle speed sensor 150 may be any sensor or system of sensors for generating a signal indicative of vehicle speed. For example, without limitation, a vehicle speed sensor 150 may be a tachometer that is capable of generating a signal indicative of a rotation speed of a shaft as in a vehicle engine or a drive shaft. Vehicle speed sensor signals are communicated to the electronic control unit 130 and converted to a vehicle speed value. The vehicle speed value is indicative of the speed of the vehicle 110. In some embodiments, the vehicle speed sensor 150 comprises an opto-isolator slotted disk sensor, a Hall Effect sensor, a Doppler radar, or the like. In some embodiments, a vehicle speed sensor 150 may comprise data from a GPS 152 for determining the speed of a vehicle 110. The vehicle speed sensor 150 may be provided so that the electronic control unit 130 may determine when the vehicle 110 accelerates, maintains a constant speed, slows down or comes to a stop. For example, a vehicle speed sensor 150 may provide signals to the electronic control unit 130 indicative of a vehicle 110 slowing down prior to making a vehicle turning maneuver.

Still referring to FIGS. 1A and 1B, a global positioning system, GPS 152, is coupled to the communication path 120 and communicatively coupled to the electronic control unit 130. The GPS 152 is capable of generating location information indicative of a location of the vehicle 110 by receiving one or more GPS signals from one or more GPS satellites. The GPS signal communicated to the electronic control unit 130 via the communication path 120 may include location information comprising a National Marine Electronics Association (NMEA) message, latitude and longitude data set, a street address, a name of a known location based on a location database, or the like. Additionally, the GPS 152 may be interchangeable with any other system capable of generating an output indicative of a location. For example, a local positioning system that provides a location based on cellular signals and broadcast towers or a wireless signal detection device capable of triangulating a location by way of wireless signals received from one or more wireless signal antennas.

In some embodiments, the one or more external vehicle environment sensors may include a LIDAR system 154. The LIDAR system 154 is communicatively coupled to the communication path 120 and the electronic control unit 130. A LIDAR system 154 or light detection and ranging system uses pulsed laser light to measure distances from the LIDAR system 154 to objects that reflect the pulsed laser light. A LIDAR system 154 may be made of solid-state devices with few or no moving parts, including those configured as optical phased array devices where its prism-like operation permits a wide field-of-view without the weight and size complexities associated with a traditional rotating LIDAR system. The LIDAR system 154 is particularly suited to measuring time-of-flight, which in turn can be correlated to distance measurements with objects that are within a field-of-view of the LIDAR system 154. By calculating the difference in return time of the various wavelengths of the pulsed laser light emitted by the LIDAR system 154 a digital 3-D representation of a target or environment may be generated. The pulsed laser light emitted by the LIDAR system 154 may in one form be operated in or near the infrared range of the electromagnetic spectrum, with one example having emitted radiation of about 905 nanometers. Sensors such as a LIDAR system 154 can be used by vehicle 110 to provide detailed 3-D spatial information for the identification of objects near the vehicle 110, as well as the use of such information in the service of systems for vehicular mapping, navigation and autonomous operations, especially when used in conjunction with geo-referencing devices such as GPS 152 or a gyroscope-based inertial navigation unit (INU, not shown) or related dead-reckoning system, as well as non-transitory computer readable memory 134 (either its own or memory of the electronic control unit 130).

In some embodiments, the LIDAR system 154 may be interpolated with the image data from the at least one external environment camera 148 to generate or refine a simulated model of the vehicle environment. In embodiments, the simulated model may be independently generated from the image data. Additionally, other sensor systems and mapping systems such as radar, inertial measurement units (IMU) and the like may be implemented to provide additional data to the electronic control unit 130 for processing image data to determine objects and sources of light in the environment of the vehicle 110.

The network interface hardware 160 is coupled to the communication path 120 and communicatively coupled to the electronic control unit 130. The network interface hardware 160 may be any device capable of transmitting and/or receiving data via a network 170. Accordingly, network interface hardware 160 can include a communication transceiver for sending and/or receiving any wired or wireless communication. For example, the network interface hardware 160 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 160 includes hardware configured to operate in accordance with the Bluetooth wireless communication protocol. In another embodiment, network interface hardware 160 may include a Bluetooth send/receive module for sending and receiving Bluetooth communications to/from a network 170. The network interface hardware 160 may also include a radio frequency identification ("RFID") reader configured to interrogate and read RFID tags.

In some embodiments, the vehicle lamp control system 100 may be communicatively coupled to nearby vehicles via the network 170. In some embodiments, the network 170 is a personal area network that utilizes Bluetooth technology to communicatively couple the vehicle lamp control system 100 and the nearby vehicles. In other embodiments, the network 170 may include one or more computer networks (e.g., a personal area network, a local area network, or a wide area network), cellular networks, satellite networks and/or a global positioning system and combinations thereof. Accordingly, the vehicle lamp control system 100 can be communicatively coupled to the network 170 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Still referring to FIGS. 1A and 1B, as stated above, the network 170 may be utilized to communicatively couple the vehicle lamp control system 100 with the nearby vehicles. The nearby vehicles may include network interface hardware 160 and an electronic control unit 130 having a processor 132 and non-transitory computer readable memory 134 capable of being communicatively coupled with the vehicle lamp control system 100. A processor 132 of the nearby vehicles may execute a machine-readable instruction set stored in the non-transitory computer readable memory 134 to communicate with the vehicle lamp control system 100.

The following sections will now describe embodiments of the operation of the vehicle lamp control system 100 for dynamically controlling cornering lamps or auxiliary lamps on a vehicle during a vehicle turning maneuver. Although embodiments disclosed herein refer to cornering lamps and auxiliary lamps, the embodied systems and methods may also be applied to a low beam lamp 138 and/or a high beam lamp 140. In embodiments of the vehicle lamp control system 100, the system comprises an electronic control unit 130 having a processor 132 and a non-transitory computer readable memory 134, a vehicle headlamp unit 136, at least one external environment camera 148, a vehicle speed sensor 150, a GPS 152, and a LIDAR system 154 communicatively coupled to the electronic control unit 130. In some embodiments, the vehicle lamp control system 100 includes additional sensors and systems as described herein.

Figure 2:
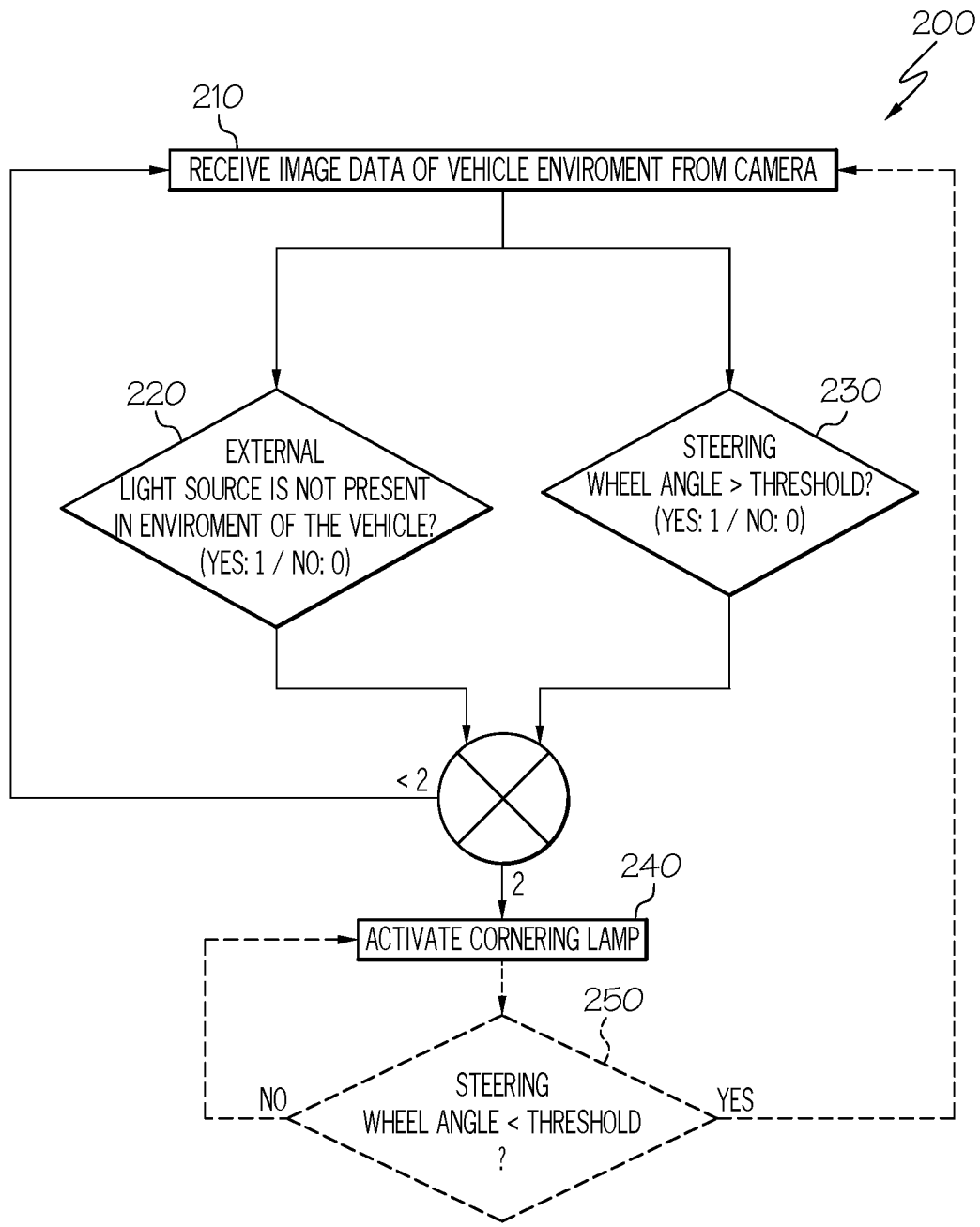
FIG. 2 is a flowchart depicting a dynamic control method for controlling vehicle headlamps according to one or more embodiments shown and described herein.

Referring now to FIG. 2, a flowchart 200 of a method for a vehicle lamp control system 100 for dynamically controlling cornering lamps or auxiliary lamps on a vehicle during a vehicle turning maneuver is depicted. The flowchart 200 depicted in FIG. 2 is a representation of a machine-readable instruction set stored in the non-transitory computer readable memory 134 and executed by the processor 132 of the electronic control unit 130. The process of the flowchart 200 in FIG. 2 may be executed at various times and in response to signals from the sensors communicatively coupled to the electronic control unit 130.

In step 210, the electronic control unit 130 receives image data of a vehicle environment from the at least one external environment camera 148. The at least one external environment camera 148 may be positioned on the dashboard of the vehicle 110 to capture images of the surroundings in front of the vehicle 110 during operation. The position of the at least one external environment camera 148 is not limited to the dashboard of the vehicle 110. The at least one external environment camera 148 may be positioned anywhere on or within the vehicle 110 to capture images of surroundings of the vehicle 110 during operation.

In step 210, the electronic control unit 130 may also receive signals from a LIDAR system 154 and/or a GPS 152. In embodiments, the LIDAR system 154 includes one or more LIDAR sensors communicatively coupled to the electronic control unit 130 and positioned on a vehicle 110 to map an external environment of the vehicle 110. The one or more LIDAR sensors, like the at least one external environment camera 148, for example, may positioned at one or more locations on a vehicle 110 such as the bumpers, the dashboard, above the windshield, on the roof, or the like to form fields-of-view around the vehicle 110. The one or more LIDAR sensors and system illuminate a target with a pulsed laser light and measure the reflected pulses with a sensor to measure distance to the target. The distance measurement signals generated by the one or more LIDAR sensors are received by the processor 132 and analyzed to generate a topology of the environment around the vehicle 110. The processor 132 may combine the distance measurement signals generated by the one or more LIDAR sensors with the image data from the at least one external environment camera 148 to refine a topology or simulated model of the environment around the vehicle. From the topology or simulated model, the processor 132 may determine and identify the presence of objects, roads or signs along with sources and quantity of light in an environment of a vehicle 110.

In some embodiments, the electronic control unit 130 may also receive signals from a GPS 152 and map data. The GPS 152 is communicatively coupled to the electronic control unit 130 and the map data may be stored in non-transitory computer readable memory 134. The GPS 152 may generate signals indicative of a location of a vehicle 110 and provide those to the electronic control unit 130. The electronic control unit 130 may then correlate signals indicative of the location of the vehicle 110 with map data stored in the non-transitory computer readable memory 134 to further determine and identify the presence of objects, roads or signs and expected light sources and quantity of light in an environment of a vehicle 110. For example, if the GPS 152 indicates that the vehicle 110 is on a country road then an expected light source may be natural light and assumed to be low should the time of day indicate dusk-to-dawn. Conversely, if the GPS 152 indicates that the vehicle 110 is on a city street then the expected light source may be artificial light and considered medium to high, i.e., compared to a country road location. Although a GPS 152 cannot determine a source or amount of light in an environment of a vehicle 110, the location of a vehicle 110 indicated by the GPS 152 can be predictive of the types of light and the amount of light in the environment of the vehicle 110.

Once at least image data is received by the electronic control unit 130 in step 210, the electronic control unit 130 with processor 132 preforms at least two separate analyses of the image data in steps 220 and 230 to determine an external light source in the environment of the vehicle 110 and whether the vehicle 110 is making a vehicle turning maneuver, respectively.

Image data generated by the at least one external environment camera 148 is received by the electronic control unit 130 where the image data is processed by the processor 132 implementing one or more algorithms known or yet-to-be developed for determining the presence of a light source and/or amount of light in the environment of the vehicle 110. Additionally, the image data may be processed by the processor 132 implementing one or more algorithms known or yet-to-be developed for determining the presence of objects, roads or signs in an environment of a vehicle 110. In some embodiments, image data generated by the at least one external environment camera 148 may be pre-processed by an image processor before being transmitted to and received by the electronic control unit 130. Alternatively, processing the image data may occur within an image-processing controller having a separate processor and non-transitory computer readable memory 134 communicatively coupled to the electronic control unit 130.

Analyzing image data may include pre-processing, recognition of objects, roads, signs and/or other features, and post-processing steps. As a non-limiting example, during pre-processing an image may be reviewed to reduce noise in the image data, enhance contrast, apply scale-spacing to address variations in sizes between real-world objects and image data of the real-world object, or the like. Further, as a non-limiting example, recognition of objects, roads, signs and/or other features from the image data may comprise applying pattern matching algorithms, image correlation algorithms or the like. Analyzing the image data may also include, for example, post-processing of the image data including filtering the converted image data through a database of known objects, roads, or signs thereby associating the converted image data with known locations, representative images, or the like.

Additionally, to determine the source of light and the amount of light in the image data, the processor 132 may implement lighting analysis software known or yet-to-be developed. In some cases, the software may include a pixel-by-pixel analysis. For example, without limitation, each color channel value of each pixel may be converted to its intensity using a known or assumed gamma value of the camera. Then, segments of the image data may be identified as more or less intense than adjacent segments. In some embodiments, corrective measures may be applied for values of green, red or blue colors based on the sensitivity of the human eye to the specific color band. In other embodiments, regression techniques such as least squares or calculating the average pixel distance from white/black may also be used. However, other methods depending on the required accuracy and lighting source may be implemented.

Step 220 is not limited to determining whether an external light source is present in the environment of the vehicle. Step 220 may also identify where the external light source is originating from and where the external light source may interact with the vehicle 110 in the environment. In other words, the image data may be used to create a light map of the environment to determine whether the vehicle is in a location in the environment which requires additional lighting from one or more of the lamps in the vehicle headlamp unit 136 or whether one or more of the lamps in the vehicle headlamp unit 136 may be dimmed or extinguished based on the presence of an external light source in the environment of the vehicle. An external light source, for example, without limitation, may include a street lamp, a vehicle headlight from another vehicle on the road, the sun, or the like. Example situations are depicted and described herein with reference to FIGS. 3A to 6. In some embodiments, the determination that no light source is present in the environment of the vehicle 110 may be sufficient to cause the electronic control unit 130 to generate a signal to activate one or more lamps in the vehicle headlamp unit 136. Conversely, the determination that a light source is present in the environment of the vehicle 110 may be sufficient to cause the electronic control unit 130 to generate a signal to deactivate one or more lamps in the vehicle headlamp unit 136. However, as depicted in flowchart 200, step 230 must also determine that a steering wheel angle surpasses a threshold to activate a cornering lamp 144 or auxiliary lamp.

In step 230, the electronic control unit 130 may determine whether a vehicle 110 is preforming a turning maneuver in at least one of two ways. In embodiments, image data may be further processed to determine whether the vehicle 110 is deviating from a current trajectory, thereby preforming a turning maneuver by comparing a sequence of image data or video data for a change in direction of the vehicle 110 in relation to an identified path of travel. For example, a processor 132 of the electronic control unit 130 may analyze and detect road boundaries using one or more object and road detection algorithms known or yet-to-be developed. In response to at least two sequential image data inputs, a processor may determine a vehicle trajectory. In the event a third image data input includes a change in angle between the previously determined vehicle trajectory from the at least two sequential image data inputs and the vehicle trajectory determined from the third image data, then the processor 132 may determine that the vehicle 110 is preforming a turning maneuver. This determination may or may not be supplemented or replaced by a steering wheel sensor system 146 for determining the same.

In some embodiments, whether a vehicle 110 is preforming a turning maneuver is determined by a processor 132 analyzing signals received from the steering wheel sensor system 146. For example, when a steering wheel sensor system 146 indicates a steering wheel has been rotated beyond a threshold then the processor 132 determines that a vehicle is preforming a turning maneuver. The threshold may be a single preset value stored in the non-transitory computer readable memory 134, selected from one of many values stored in the non-transitory computer readable memory 134 or computed based on vehicle 110 and environment conditions. For example, without limitation, a threshold may be selected or computed in response to signals from a vehicle speed sensor 150, signals from the GPS 152, image data from the at least one external environment camera 148, the like or a combination thereof. For example, when a vehicle 110 is traveling at a high rate of speed a threshold may be lower than a threshold for a vehicle that is traveling at a low rate of speed because the amount of steering wheel input to effect a turn may be less at a high rate of speed than at a low rate of speed. In other words, for example, without limitation, if a steering wheel sensor system 146 detects a steering wheel input of 15 degrees while the vehicle 110 is traveling at 25 mph this may not be indicative of a turn, which requires activation of a cornering lamp 144. Whereas if a steering wheel sensor system 146 detects a steering wheel input of 15 degrees while the vehicle 110 is traveling at 70 mph this may be indicative of a vehicle traversing a turn on the highway which may require activation of a cornering lamp 144 to assist in navigating the turn at a high rate of speed albeit a slight turn.

In addition to or in place of using a vehicle speed sensor 150 to determine a threshold, signals from a GPS 152 providing location information and/or vehicle speed data may also be analyzed by the processor 132. Signals from a GPS 152 may provide the processor 132 with information regarding the location of a vehicle 110. The location of a vehicle may indicate, for example, that the vehicle 110 is in a city, on a highway, or on a country road. Based on the vehicle location, a processor 132 may determine a threshold that the steering wheel angle should exceed before determining that the vehicle is preforming a turning maneuver. Highways generally include more gradual turns, but at higher rates of speed than city streets, a gradual turn on a highway may require additional lighting in front and around the vehicle to provide the driver with the ability to perceive more of the environment around the vehicle to improve navigation with the reduced reaction time associate with highway driving. City streets generally include turns comprising about 90 degrees. Therefore, when a vehicle is determined to be in a city from the GPS 152, the threshold may be greater than a threshold for a highway or high rate of speed. In some embodiments, the threshold may be 15 degrees, 25 degrees, 30 degrees, 60 degrees, 75 degrees or 80 degrees.

Since a steering wheel angle of rotation is typically not a 1:1 ratio to the angle of rotation of a vehicle wheel, the electronic control unit 130 may properly convert any threshold to relate to the sensor system and source of data used to determine whether a vehicle 110 is preforming a turning maneuver. For example, many vehicles have a 12:1 or 20:1 steering wheel angle input to angle of rotation of a vehicle wheel configuration. Therefore, if signals from a GPS 152 are determined to indicate that the vehicle 110 is traversing a 5 degree turn then the 5 degrees may be multiplied by 12 before comparing to the threshold if the threshold value is set to correspond to the steering wheel angle of rotation.

When the processor 132 determines that there is no light present in the environment of the vehicle and the steering wheel angle is beyond a threshold from steps 220 and 230, respectively, then in step 240 the electronic control unit 130 generates a control signal to activate one or more lamps in the vehicle headlamp unit 136. More specifically, in the embodiment described by way of flowchart 200, the control signal activates the cornering lamp 144. In some embodiments, activation of the cornering lamp 144 is limited to the cornering lamp 144 associated with the direction the vehicle is turning. For example, if the vehicle 110 is turning right then the right cornering lamp 144 is activated.

In some embodiments, the processor 132 may further determine a light quantity level from the image data of the vehicle environment and cause the electronic control unit to generate a control signal for activating the vehicle cornering lamp that is indicative of a first illumination level when the light quantity level is below a first light threshold and to generate a control signal for activating the vehicle cornering lamp that is indicative of a second illumination level when the light quantity level is above the first light threshold. For example, the illumination level of the cornering lamp may be configured to be proportional to the quantity of light determined in the environment of the vehicle.

Once the lamp is activated, step 250 continuously monitors the steering wheel angle for indication that it has dropped below the threshold. In some embodiments, the threshold in step 250 has the same value as the threshold in step 230. In other embodiments, the threshold in step 250 is a different value than the threshold in step 230. When the steering wheel angle drops below the threshold, one or more lamps of the vehicle headlamp unit 136 are deactivated. For example, when a steering wheel angle of greater than 25 degrees to the right drops below 25 degrees the cornering lamp 144 illuminating the section forward and right of the vehicle 110 is extinguished.

In some embodiments, when a cornering lamp 144 is activated or extinguished they may be fully activated or deactivated or set to a value between off and fully on. In some embodiments, when the cornering lamp 144 is activated the control signal generated for activating the cornering lamp 144 causes the cornering lamp 144 to increase in illumination level over a period of time, i.e., fade on. Similarly, when the cornering lamp 144 is deactivated the control signal generated for deactivating the vehicle cornering lamp causes the cornering lamp 144 to decrease in illumination level over a period of time, i.e., fade off. In some embodiments, the cornering lamp 144 may be activated in proportion to the external light source present in the environment of the vehicle. For example, if a street lamp is detected to provide illumination to a first level then the cornering lamp 144 may be activated only a portion of the full amount of illumination of the cornering lamp 144 such that the combination of the street lamp and cornering lamp 144 may provide the same or approximate illumination as if only the light from the cornering lamp 144 were present. That is, the cornering lamp 144 provides supplemental light to the area already partially illuminated by the street lamp. This may be necessary or preferred, for example, when making a turn in a neighborhood and a pedestrian is detected in the environment of the vehicle. In such a case, fully illuminating the cornering lamp 144 may blind the pedestrian or obscure the pedestrian from the driver's view, whereas providing supplemental illumination to that of the street lamp may better illuminate the turn and not blind the pedestrian. This may also be the case when a vehicle is making a turn on a neighborhood or city street where a second vehicle is present in the field-of-view of the turning maneuver of the vehicle 110 as described in more detail with relation to FIG. 4.

Figure 3A:
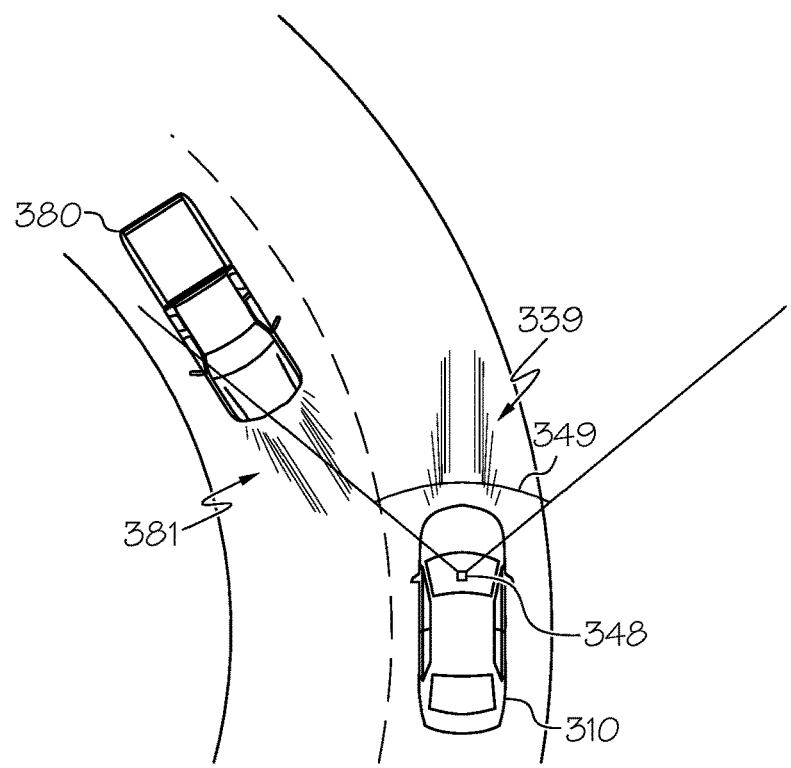
FIG. 3A depicts a vehicle employing a vehicle lamp control system on a turn in the road with a second vehicle approaching in an opposing direction according to one or more embodiments shown and described herein.

FIGS. 3A to 6 will now depict some example situations implementing the vehicle lamp control system 100 for dynamically controlling cornering lamps or auxiliary lamps on a vehicle during a vehicle turning maneuver. Referring to FIGS. 3A and 3B, a pair of example situations including a vehicle 310 employing the vehicle lamp control system 100 on a turn in the road with (FIG. 3A) and without (FIG. 3B) a second vehicle 380 is depicted. FIG. 3A depicts a vehicle 310 rounding a turn to the left and a second vehicle 380 rounding the same turn in an opposing direction to the right. For purposes of this situation, the setting is between dusk and dawn where the only lights illuminating the road are the low beam lights 339 of the vehicle 310 and the low beam light 381 of the second vehicle 380. Otherwise, the road and environment surrounding the vehicle 310 is dark. The vehicle 310 includes at least one external environment camera 348 with a field-of-view 349 and a steering wheel sensor system configured as inputs to the vehicle lamp control system 100. While these are the only inputs discussed for purposes of the examples depicted in FIGS. 3A to 6, it should be understood that they may be supplemented for other sensors and systems to achieve the same goals as described herein. It should also be understood that weather events may cause darkness during dawn to dusk periods of the day causing low or no light situations similar to those from dusk to dawn.

Figure 3B:
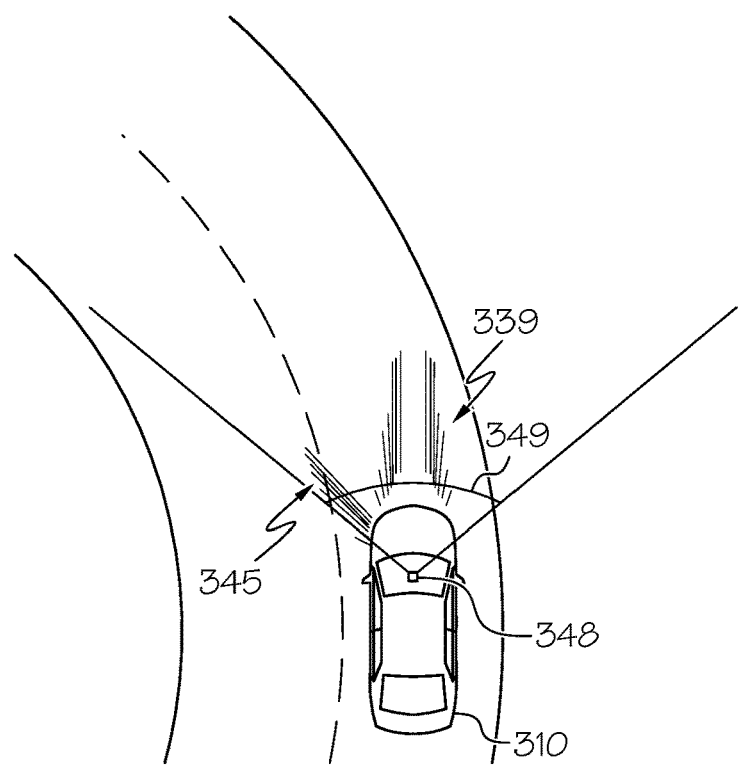
FIG. 3B depicts a vehicle employing a vehicle lamp control system on a turn in the road without a second vehicle approaching in an opposing direction according to one or more embodiments shown and described herein.

Referring to FIG. 3A, as the vehicle 310 rounds the turn, the at least one external environment camera 348 captures and transmits image data to the electronic control unit. Additionally, the steering wheel sensor system indicates that the vehicle is preforming a turning maneuver to the left greater than a threshold. The processor analyzes the image data and determines that there is an external light source present in the environment of the vehicle 310. The processor further determines that the external light source originates from a source in the vicinity that would be illuminated by the left cornering lamp of the vehicle 310 and presently illuminates the same. Therefore, the electronic control unit determines that an external light source is present causing the electronic control unit to not activate the left cornering lamp while the low beam light 381 from the second vehicle 380 illuminates the area that would be illuminated by the left cornering lamp. However, once the low beam light 381 generated by the second vehicle 380 is no longer present, the electronic control unit causes the left cornering lamp to activate providing cornering light 345 forward and to the left of the vehicle 310 as it rounds the turn as depicted in FIG. 3B.

In some situations, although not depicted, the vehicle lamp control system 100 may cause the cornering lamp that illuminates a direction opposing that of the turning maneuver of the vehicle to be activated in place of or along with the cornering lamp in the direction of the turning maneuver. For example, as a vehicle rounds a turn to the left, the left cornering lamp may be activated; however, in some cases the right cornering lamp may also be illuminated. This may provide a driver with a larger illuminated viewing angle of the environment when preforming turning maneuvers. In other words, since a vehicle is turning to the left the forward right section of a vehicle environment may no longer be illuminated by the low beam lamps thereby not providing illumination of guardrails or other objects along the right side of a left turn.

In yet other situations, vehicle 310 as shown in FIG. 3A may be approaching the second vehicle 380 with their high beam lamps activated in the same situation as described above. In such a case, the vehicle lamp control system 100 may deactivate the high beam lamps when an opposing light source and/or the second vehicle 380 is detected from the image data. Additionally, the vehicle lamp control system 100 may activate the cornering lamps in place of the high beam lamps to provide the driver with a wider illuminated viewing angle of the environment in front of the vehicle until the low beam light 381 from the second vehicle 380 exceeds an illumination value. At that time, the cornering lamps may be dimmed or extinguished depending on the illumination value determined from the image data.

Figure 4:
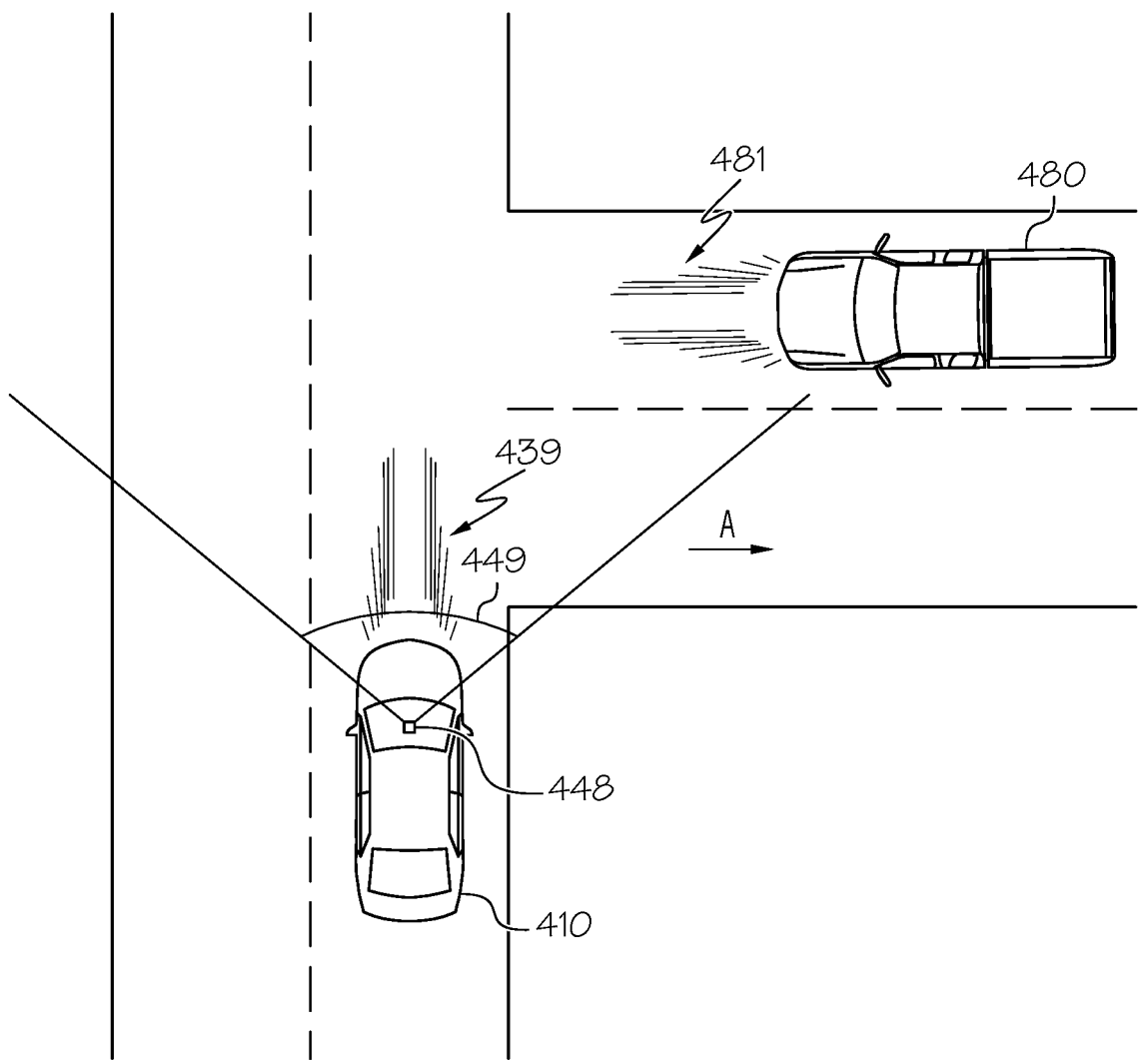
FIG. 4 depicts a vehicle equipped with the vehicle lamp control system and a second vehicle approaching a three-way intersection according to one or more embodiments shown and described herein.

Referring now to FIG. 4, a three-way intersection having two vehicles approaching the intersection is depicted. Vehicle 410, with right of way, is approaching the intersection and will be turning right to travel in the direction indicated by arrow A. A second vehicle 480 with its low beam lights 481 illuminated is approaching the intersection from the intersecting street. For purposes of this situation, the setting is between dusk and dawn where the only lights illuminating the road are the low beam lights 439 of the vehicle 410 and the low beam light 481 of the second vehicle 480. Otherwise, the road and environment surrounding the vehicle 410 is dark. Vehicle 410 includes at least one external environment camera 448 with a field-of-view 449 and a steering wheel sensor system configured as inputs to the vehicle lamp control system 100.

As the vehicle 410 approaches the intersection the at least one external environment camera 448 captures and transmits image data to the electronic control unit. Since the vehicle 410 has not started making the right turn, the steering wheel sensor system indicates that the steering wheel angle is less than a threshold. However, the processor still analyzes the image data to determine whether there is an external light source present in the environment of the vehicle. As shown in FIG. 4, the processor determines from the image data that the low beam light 481 from the second vehicle 480 is present in the environment of the vehicle 410. Therefore, once the steering wheel angle exceeds the threshold in making the right turn the cornering lamp will not be activated until the low beam light 481 is either not detected in any part of the environment of the vehicle 410 captured by field-of-view 449 of the at least one external environment camera 448 or until at least the portion of the environment that would be illuminated by the cornering lamp is no longer illuminated by the low beam light 481 of the second vehicle 480. By not illuminating the cornering lamp in the situation depicted in at least FIG. 4, the vehicle 410 avoids possibly blinding the driver of the second vehicle 480, does not provide illumination where illumination is not needed, and/or converses power by not having to illuminate the cornering lamp in the presence of an already illuminated path.

Figure 5:
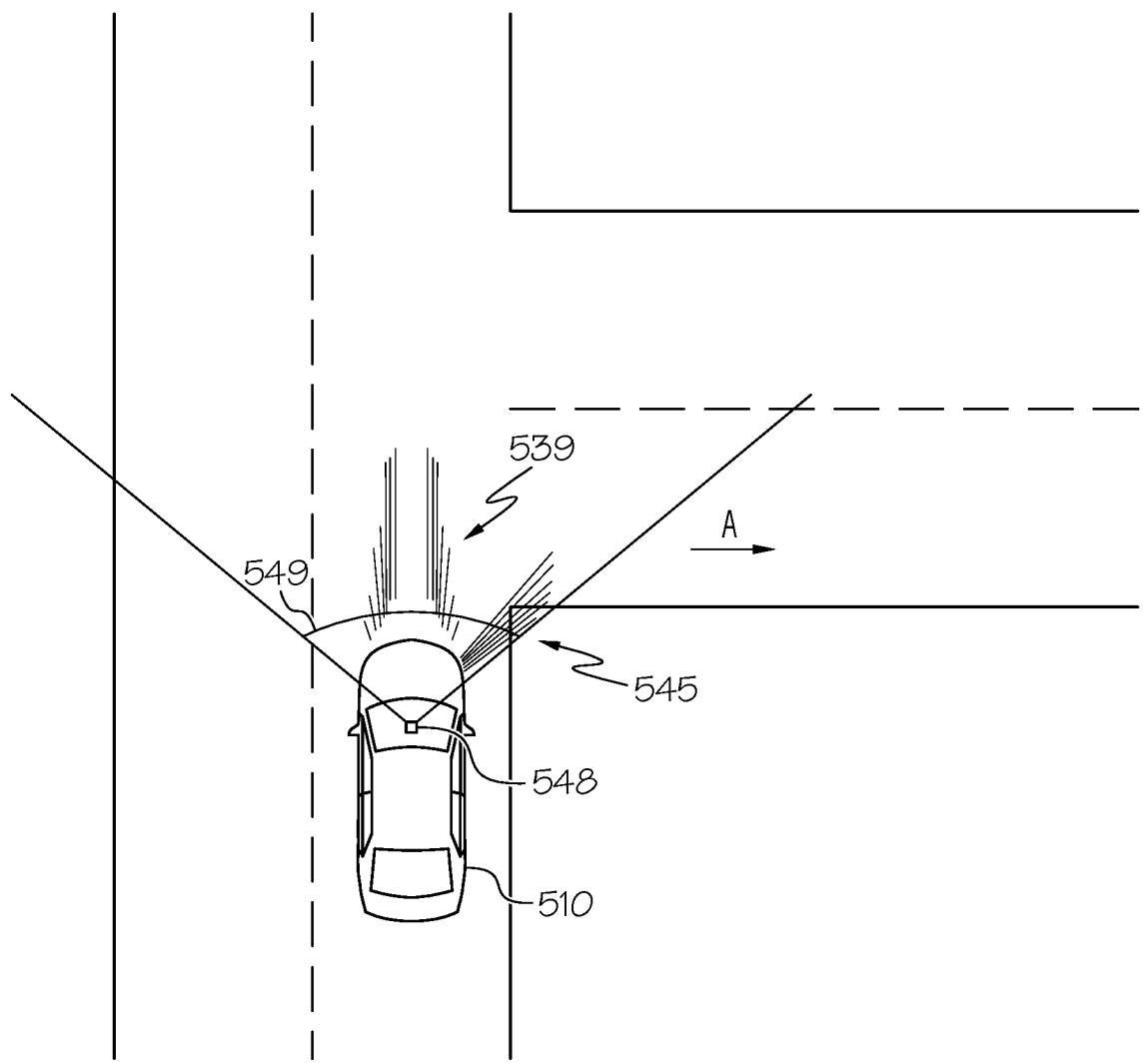
FIG. 5 depicts a vehicle equipped with the vehicle lamp control system approaching a three-way intersection according to one or more embodiments shown and described herein.

Referring now to FIG. 5, a similar situation to FIG. 4 is depicted except the second vehicle is not present. Again, for purposes of this situation, the setting is between dusk and dawn where the only light illuminating the road is the low beam lights 539 of the vehicle 510. Otherwise, the road and environment surrounding the vehicle 510 is dark. Vehicle 510 includes at least one external environment camera 548 with a field-of-view 549 and a steering wheel sensor system configured as inputs to the vehicle lamp control system 100.

As the vehicle 510 approaches the intersection the at least one external environment camera 548 captures and transmits image data to the electronic control unit. Since the vehicle 510 has not started making the right turn, the steering wheel sensor system indicates that the steering wheel angle is less than a threshold. However, the processor may still analyze the image data to determine whether there is an external light source present in the environment of the vehicle. As shown in FIG. 5, the processor determines there is no external light source present in the environment of the vehicle 510. Therefore, once the steering wheel angle exceeds the threshold in making the right turn the cornering lamp providing cornering light 545 will be activated. The cornering light 545 will remain active until the steering wheel angle returns to a value below the threshold.

Figure 6:
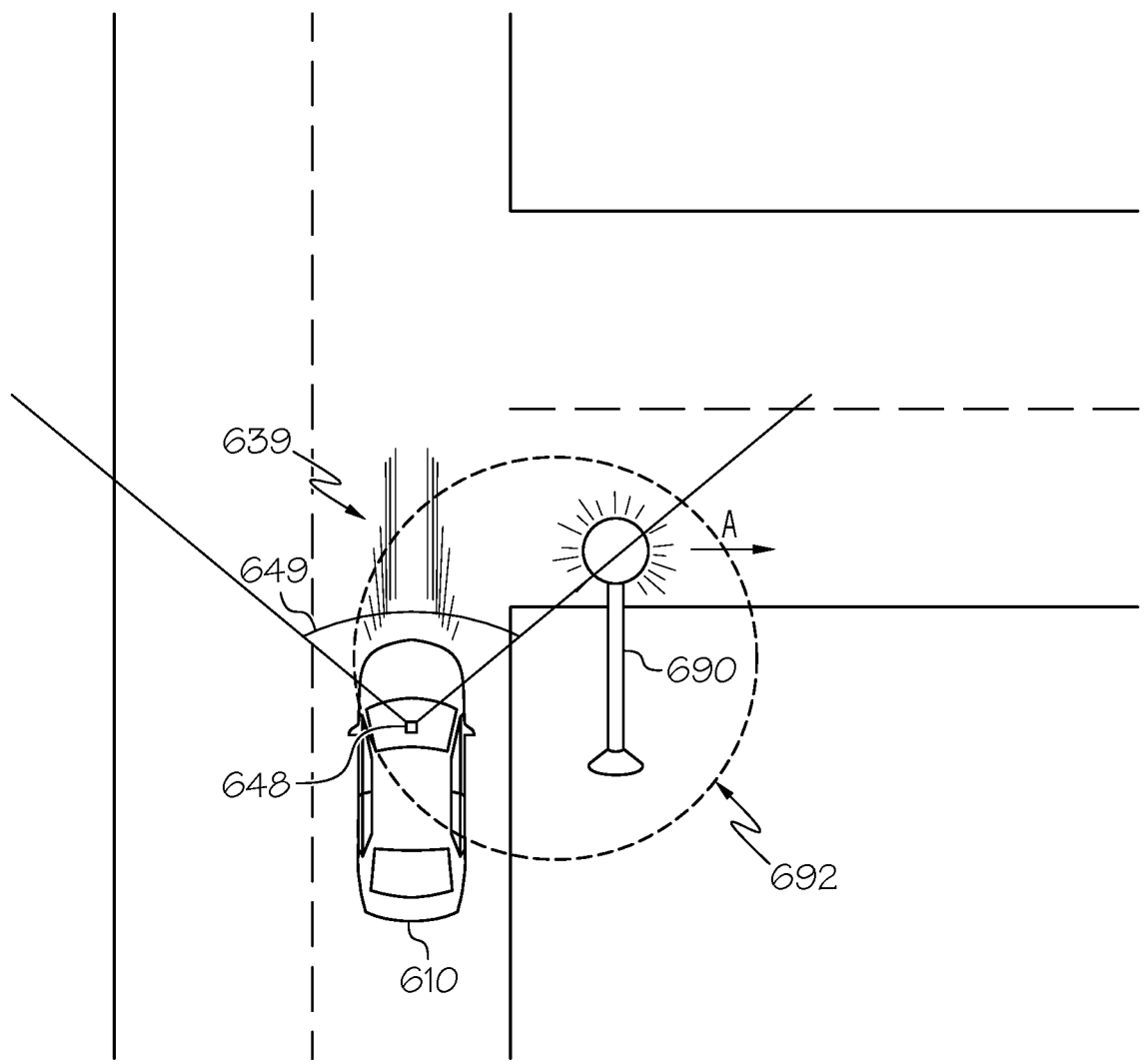
FIG. 6 depicts a vehicle equipped with the vehicle lamp control system approaching a three-way intersection illuminated by a street lamp according to one or more embodiments shown and described herein.

In yet a third similar situation to FIGS. 4 and 5, FIG. 6 depicts a three-way intersection with vehicle 610 approaching the intersection to make a turn to travel in the direction indicated by arrow A and a street lamp 690 positioned on a corner of the intersection. The street lamp 690 illuminates a lighted area 692 generally depicted the dashed line in FIG. 6. Again, for purposes of this situation, the setting is between dusk and dawn where the only light illuminating the road is the low beam lights 639 of the vehicle 610 and the street lamp 690. Otherwise, the road and environment surrounding the vehicle 510 is dark. Vehicle 610 includes at least one external environment camera 548 with a field-of-view 649 and a steering wheel sensor system configured as inputs to the vehicle lamp control system 100.

As the vehicle 610 approaches the intersection the at least one external environment camera 648 captures and transmits image data to the electronic control unit. Since the vehicle 510 has not started making the right turn, the steering wheel sensor system indicates that the steering wheel angle is less than a threshold. However, the processor still analyzes the image data to determine whether there is an external light source present in the environment of the vehicle. As shown in FIG. 6, the processor determines there is an external light source present in the environment of the vehicle 610. Although, the processor may not be able to determine the location from which the external light source originates from, since the street lamp 690 may be projecting light from above the field-of-view 649 of the at least one external environment camera 648, reflected light off the street and surrounding objects is captured by the at least one external environment camera 648. Therefore, while the vehicle 610 traverses the right turn in the lighted area 692 and the steering wheel angle is above the threshold, the cornering lamp remains deactivated.

It should now be understood that embodiments described herein are directed to vehicle lamp control systems that activate cornering lamps, auxiliary lamps and other vehicle headlamps in response to determining whether an external light source is present in the environment of the vehicle using at least image data captured from at least one external environment camera. The vehicle lamp control system may include a vehicle headlamp unit, a steering wheel sensor system, at least one external environment camera, a vehicle speed sensor, a GPS, a LIDAR system, an electronic control unit having a processor and non-transitory computer readable memory for storing at least a machine-readable instruction set, and network interface hardware.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A vehicle lamp control system comprising:
  an electronic control unit comprising a processor and a non-transitory computer readable memory;
  at least one external environment camera configured to output image data of a vehicle environment, wherein the at least one external environment camera is communicatively coupled to the electronic control unit;

a vehicle headlamp unit communicatively coupled to the electronic control unit;
a steering wheel sensor communicatively coupled to the electronic control unit; and
a machine-readable instruction set stored in the non-transitory computer readable memory that causes the vehicle lamp control system to perform at least the following when executed by the processor:
receive the image data of the vehicle environment from the at least one external environment camera;
determine whether an artificial external light source from a second vehicle or a street lamp is present in the vehicle environment based on the image data of the vehicle environment;
determine a steering wheel angle based on an output signal of the steering wheel sensor;
determine an activation steering threshold based on a type of path of travel of the vehicle; and
generate a control signal for activating a lamp of the vehicle headlamp unit, when the steering wheel angle exceeds the activation steering threshold and no artificial external light is detected in the vehicle environment.

2. The vehicle lamp control system of claim 1; wherein the machine-readable instruction set, when executed by the processor further causes the vehicle lamp control system to:
determine a light quantity level from the image data of the vehicle environment;
generate the control signal for activating the lamp of the vehicle headlamp unit at a first illumination level when the light quantity level is below a first light threshold; and
generate the control signal for activating the lamp of the vehicle headlamp unit at a second illumination level when the light quantity level is above the first light threshold.

3. The vehicle lamp control system of claim 1, wherein the machine-readable instruction set, when executed by the processor further causes the vehicle lamp control system to:
generate a second control signal for deactivating the lamp of the vehicle headlamp unit when the steering wheel angle is below a deactivation steering threshold.

4. The vehicle lamp control system of claim 1, further comprising a GPS communicatively coupled to the electronic control unit, wherein the machine-readable instruction set, when executed by the processor further causes the vehicle lamp control system to:
receive GPS data from the GPS;
determine a location of a vehicle from the GPS data; and
determine the type of path of travel of the vehicle to be at least one of a highway, a residential street, and a country road.

5. The vehicle lamp control system of claim 1, wherein the machine-readable instruction set, when executed by the processor further causes the vehicle lamp control system to:
analyze one or more pixels of the image data to determine a source location of the artificial external light source within the vehicle environment.

6. The vehicle lamp control system of claim 1, wherein the machine-readable instruction set, when executed by the processor further causes the vehicle lamp control system to:
generate a simulated model of the vehicle environment based on the image data from the at least one external environment camera; and
determine one or more light quantity levels of the artificial external light source, within the simulated model of the vehicle environment.

7. The vehicle lamp control system of claim 6, wherein the machine-readable instruction set, when executed by the processor further causes the vehicle lamp control system to:
adjust the control signal generated for activating the lamp of the vehicle headlamp unit based on the one or more light quantity levels of the artificial external light source determined from the simulated model of the vehicle environment.

8. The vehicle lamp control system of claim 1, further comprising a vehicle speed sensor communicatively coupled to the electronic control unit, wherein the vehicle speed sensor outputs a speed signal indicative of a vehicle speed and the machine-readable instruction set, when executed by the processor further causes the vehicle lamp control system to:
receive a speed signal output from the vehicle speed sensor;
determine the vehicle speed based on the speed signal output by the vehicle speed sensor; and
determine the activation steering threshold based on the vehicle speed.

9. A method for controlling a vehicle headlamp unit, the method comprising:
receiving image data of a vehicle environment from at least one external environment camera;
determining whether an artificial external light source from a second vehicle or a street lamp is present in the vehicle environment based on the image data of the vehicle environment;
determining a steering wheel angle based on an output signal of a steering wheel sensor;
determining an activation steering threshold based on the type of path of travel of the vehicle; and
generating a control signal for activating a lamp of the vehicle headlamp unit when the steering wheel angle exceeds the activation steering threshold and no artificial external light is detected in the vehicle environment.

10. The method of claim 9, further comprising:
determining a light quantity level from the image data of the vehicle environment,
generating the control signal for activating the lamp of the vehicle headlamp unit at a first illumination level when the light quantity level is below a first light threshold; and
generating the control signal for activating the lamp of the vehicle headlamp unit at a second illumination level when the light quantity level is above the first light threshold.

11. The method of claim 9, further comprising:
generating a second control signal for deactivating the vehicle headlamp unit when the steering wheel angle is below a deactivation steering threshold.

12. The method of claim 9, further comprising:
receiving GPS data from a GPS,
determining a location of a vehicle from the GPS data; and
determining the type of path of travel of the vehicle to be at least one of a highway, a residential street, and a country road.

13. The method of claim 9, further comprising:
receiving a speed signal output from a vehicle speed sensor;

determining a vehicle speed based on the speed signal output by the vehicle speed sensor; and determining the activation steering threshold based on the vehicle speed.

14. A vehicle comprising:

an electronic control unit comprising a processor and a non-transitory computer readable memory;

at least one external environment camera configured to output image data of a vehicle environment, wherein the at least one external environment camera is communicatively coupled to the electronic control unit;

a vehicle headlamp unit communicatively coupled to the electronic control unit;

a steering wheel sensor communicatively coupled to the electronic control unit;

and a machine-readable instruction set stored in the non-transitory computer readable memory that causes the vehicle to perform at least the following when executed by the processor:

receive the image data of the vehicle environment from the at least one external environment camera;

determine whether an artificial external light source from a second vehicle or a street lamp is present in the vehicle environment based on the image data of the vehicle environment;

determine a steering wheel angle based on an output signal of the steering wheel sensor;

determine an activation steering threshold based on the type of path of travel of the vehicle;

and generate a control signal for activating a lamp of the vehicle headlamp unit, when the steering wheel angle exceeds the activation steering threshold and no artificial external light is detect in the vehicle environment.

15. The vehicle of claim 14, wherein the machine-readable instruction set, when executed by the processor, further causes the vehicle to:

determine a light quantity level from the image data of the vehicle environment;

generate the control signal for activating the lamp of the vehicle headlamp unit at a first illumination level when the light quantity level is below a first light threshold; and generate the control signal for activating the lamp of the vehicle headlamp unit at a second illumination level when the light quantity level is above the first light threshold.

16. The vehicle of claim 14, wherein the machine-readable instruction set, when executed by the processor, further causes the vehicle to:

generate a second control signal for deactivating the lamp of the vehicle headlamp unit when the steering wheel angle is below a deactivation steering threshold.

17. The vehicle of claim 14, further comprising a UPS communicatively coupled to the electronic control unit and the machine-readable instruction set, when executed by the processor, further causes the vehicle to:

receive GPS data from the UPS;

determine a location of the vehicle from the GPS data; and determine the type of path of travel of the vehicle to be at least one of: a highway, a residential street, and a country road.

18. The vehicle of claim 14, wherein the machine-readable instruction set, when executed by the processor, further causes the vehicle to:

generate a simulated model of the vehicle environment based on the image data from the at least one external environment camera; and determine one or more light quantity levels of the artificial external light source, within the simulated model of the vehicle environment.

19. The vehicle of claim 18, wherein the machine-readable instruction set, when executed by the processor, further causes the vehicle to:

adjust the control signal generated for activating the lamp of the vehicle headlamp unit based on the one or more light quantity levels of the artificial external light source determined from the simulated model of the vehicle environment.

20. The vehicle of claim 14, further comprising a vehicle speed sensor communicatively coupled to the electronic control unit, wherein the vehicle speed sensor outputs a speed signal indicative of a vehicle speed and the machine-readable instruction set, when executed by the processor, further causes the vehicle to:

receive a speed signal output from the vehicle speed sensor;

determine the vehicle speed based on the speed signal output by the vehicle speed sensor; and determine the activation steering threshold based on the vehicle speed.

* * * * *

UNITED STATES PATENT AND TRADEMARK OFFICE
CERTIFICATE OF CORRECTION

PATENT NO. : 10,634,317 B2
APPLICATION NO. : 15/667880
DATED : April 28, 2020
INVENTOR(S) : Chelsea R. White Page 1 of 1

It is certified that error appears in the above-identified patent and that said Letters Patent is hereby corrected as shown below:

In the Claims

Column 20, Line 7, Claim 17, delete "UPS" and insert --GPS--, therefor.

Column 20, Line 11, Claim 17, delete "UPS" and insert --GPS--, therefor.

Signed and Sealed this
Twenty-first Day of July, 2020

Andrei Iancu
*Director of the United States Patent and Trademark Office*